(12) United States Patent
Yoo et al.

(10) Patent No.: US 7,849,421 B2
(45) Date of Patent: Dec. 7, 2010

(54) VIRTUAL MOUSE DRIVING APPARATUS AND METHOD USING TWO-HANDED GESTURES

(75) Inventors: Jang Hee Yoo, Daejeon (KR); Heung Nam Kim, Daejeon (KR); Kyung Hee Lee, Daejeon (KR); Dong Myung Sul, Daejeon (KR); Ji Young Kwak, Gwangjoo (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 946 days.

(21) Appl. No.: 11/251,699

(22) Filed: Oct. 17, 2005

(65) Prior Publication Data

US 2006/0209021 A1 Sep. 21, 2006

(30) Foreign Application Priority Data

Mar. 19, 2005 (KR) .................... 10-2005-0022932

(51) Int. Cl.
*G06F 3/033* (2006.01)
*G06F 3/03* (2006.01)

(52) U.S. Cl. .................. 715/863; 715/702; 715/773; 345/156; 345/173

(58) Field of Classification Search .............. 715/863, 715/702, 773; 345/156, 173
See application file for complete search history.

(56) References Cited

U.S. PATENT DOCUMENTS 5,767,842 A * 6/1998 Korth .................. 345/168
5,812,118 A * 9/1998 Shieh .................. 345/173
6,115,482 A * 9/2000 Sears et al. ............ 382/114
6,128,003 A * 10/2000 Smith et al. ........... 345/157
6,191,773 B1 * 2/2001 Maruno et al. ......... 345/158
6,252,598 B1 * 6/2001 Segen .................. 715/863
6,407,679 B1 * 6/2002 Evans et al. ............ 341/20
6,498,628 B2 * 12/2002 Iwamura ............... 348/734
6,624,833 B1 * 9/2003 Kumar et al. .......... 715/863
7,007,236 B2 * 2/2006 Dempski et al. ........ 715/757
7,058,204 B2 * 6/2006 Hildreth et al. ........ 382/103
7,102,615 B2 * 9/2006 Marks .................. 345/156

(Continued)

FOREIGN PATENT DOCUMENTS

JP       10-207602       8/1998

(Continued)

OTHER PUBLICATIONS

'Virtual Mouse Vision Based Interface' Robertson et al., IUI'04, Jan. 13-16, 2004, Madeira, Funchal, Portugal, pp. 177-183.

*Primary Examiner*—Steven B Theriault
(74) *Attorney, Agent, or Firm*—Ladas & Parry LLP

(57) ABSTRACT

A virtual mouse driving apparatus and method for processing a variety of gesture commands as equivalent mouse commands based on two-handed gesture information obtained by a video camera are provided. The virtual mouse driving method includes: keeping track of an input gesture input with the video camera; removing a background portion of the input gesture image and extracting a left-hand region and a right-hand region from the input gesture image whose background portion has been removed; recognizing a left-hand gesture and a right-hand gesture from the extracted left-hand region and the extracted right-hand region, respectively, and recognizing gesture commands corresponding to the recognition results; and executing the recognized gesture commands.

8 Claims, 3 Drawing Sheets

U.S. PATENT DOCUMENTS

| | | | |
|---|---|---|---|
| 7,215,322 B2 * | 5/2007 | Genc et al. | 345/157 |
| 7,274,800 B2 * | 9/2007 | Nefian et al. | 382/103 |
| 7,379,563 B2 * | 5/2008 | Shamaie | 382/103 |
| 7,411,575 B2 * | 8/2008 | Hill et al. | 345/156 |
| 7,593,552 B2 * | 9/2009 | Higaki et al. | 382/118 |
| 7,656,394 B2 * | 2/2010 | Westerman et al. | 345/173 |
| 7,705,830 B2 * | 4/2010 | Westerman et al. | 345/173 |
| 2003/0095154 A1 | 5/2003 | Colmenarez | |
| 2003/0113018 A1 * | 6/2003 | Nefian et al. | 382/181 |
| 2004/0017473 A1 * | 1/2004 | Marks | 348/207.1 |
| 2004/0032398 A1 * | 2/2004 | Ariel et al. | 345/168 |
| 2004/0046711 A1 * | 3/2004 | Triebfuerst | 345/8 |
| 2004/0046747 A1 * | 3/2004 | Bustamante | 345/173 |
| 2004/0056958 A1 * | 3/2004 | Lee | 348/207.1 |
| 2004/0085334 A1 * | 5/2004 | Reaney | 345/706 |
| 2004/0085455 A1 * | 5/2004 | Silverstein | 348/211.4 |
| 2004/0104941 A1 * | 6/2004 | Natoli | 345/772 |
| 2004/0113885 A1 * | 6/2004 | Genc et al. | 345/156 |
| 2004/0155902 A1 * | 8/2004 | Dempski et al. | 345/757 |
| 2004/0179121 A1 * | 9/2004 | Silverstein | 348/333.01 |
| 2004/0189720 A1 * | 9/2004 | Wilson et al. | 345/863 |
| 2004/0193413 A1 * | 9/2004 | Wilson et al. | 704/243 |
| 2004/0196400 A1 * | 10/2004 | Stavely et al. | 348/333.01 |
| 2004/0254982 A1 * | 12/2004 | Hoffman et al. | 709/204 |
| 2004/0257432 A1 * | 12/2004 | Girish et al. | 348/14.08 |
| 2005/0028221 A1 * | 2/2005 | Liu et al. | 725/133 |
| 2005/0057524 A1 * | 3/2005 | Hill et al. | 345/173 |
| 2005/0146622 A9 * | 7/2005 | Silverstein | 348/211.4 |
| 2006/0036944 A1 * | 2/2006 | Wilson | 715/702 |
| 2006/0176274 A1 * | 8/2006 | Cheng et al. | 345/157 |
| 2006/0182346 A1 * | 8/2006 | Yoda et al. | 382/190 |
| 2006/0238519 A1 * | 10/2006 | Westerman et al. | 345/173 |
| 2009/0237361 A1 * | 9/2009 | Mosby et al. | 345/173 |

FOREIGN PATENT DOCUMENTS

| | | |
|---|---|---|
| JP | 2003 186596 | 7/2003 |
| KR | 1998-082239 | 12/1998 |
| WO | WO 03 044648 | 5/2003 |

* cited by examiner

HOME INFORMATION APPLIANCE

VIRTUAL MOUSE DRIVING APPARATUS AND METHOD USING TWO-HANDED GESTURES

CROSS-REFERENCE TO RELATED PATENT APPLICATION

This application claims the benefit of Korean Patent Application No. 10-2005-0022932, filed on Mar. 19, 2005, in the Korean Intellectual Property Office, the disclosure of which is incorporated herein in its entirety by reference.

BACKGROUND OF THE INVENTION

1. Field of the Invention

The present invention relates to a virtual mouse system, and more particularly, to a virtual mouse driving apparatus and method which can provide a more convenient user interface for various information appliances equipped with a monitor, such as computers and set-top boxes, by obtaining two-handed gesture information using a video camera and processing a variety of two-handed gestures as equivalent mouse commands based on the obtained two-handed gesture information.

2. Description of the Related Art

Information appliances, such as computers and set-top boxes, include keyboards and mouse as user interfaces. Users input various commands to information appliances just by moving a mouse or clicking buttons of the mouse. However, a keyboard or a mouse of an information appliance is not sufficiently convenient especially when a user is on the move, carrying the information appliance. Therefore, in order to enhance the convenience of users who use information appliances, a variety of voice or gesture-based user interface methods have been developed or commercialized.

In gesture-based user interface methods, various gesture capturing tools, such as a pen, a touch pad, a camera, and etc., are used. Of the various gesture capturing tools, a pen and a touch pad are most widely used for mobile devices, such as personal digital assistants (PDAs). A gesture-based user interface system using a camera can recognize gestures of a user more precisely, and is thus more convenient than gesture-based user interface systems using other gesture capturing tools. However, due to the complexity of gesture recognition and low gesture recognition rates, the commercialization of gesture-based user interface systems using a camera is still in its infancy. Most existing gesture-based user interface systems attempt to represent a considerable number of commands as gestures using only one hand, and thus may not be able to act as an efficient user interface because of a failure to efficiently represent so many commands. In addition, recognition of hand gestures by existing gesture-based user interface systems is too complicated to achieve high gesture recognition rates.

SUMMARY OF THE INVENTION

The present invention provides a virtual mouse driving method in which a more convenient user interface can be provided by processing a variety of commands as equivalent mouse commands based on two-handed gesture information obtained using a video camera.

The present invention also provides a virtual mouse driving apparatus to which the virtual mouse driving method is applied.

According to an aspect of the present invention, there is provided a virtual mouse driving method using a video camera. The virtual mouse driving method includes: keeping track of an input gesture input with the video camera; removing a background portion of the input gesture image and extracting a left-hand region and a right-hand region from the input gesture image whose background portion has been removed; recognizing a left-hand gesture and a right-hand gesture from the extracted left-hand region and the extracted right-hand region, respectively, and recognizing gesture commands corresponding to the recognition results; and executing the recognized gesture commands.

According to another aspect of the present invention, there is provided a virtual mouse driving apparatus. The virtual mouse driving apparatus includes: a camera control unit which keeps track of a gesture with a video camera; a gesture region extraction unit which removes a background portion of the input gesture image and extracts a left-hand region and a right-hand region from the input gesture image whose background portion has been removed; a gesture recognition unit which senses left-hand gestures and right-hand gestures based on contours and features of the left and right hands extracted from the extracted left-hand and right-hand regions by the gesture region extraction unit and recognizes gesture commands represented by the sensed left-hand and right-hand gestures; and a command processing unit which processes the gesture commands recognized by the gesture recognition unit as equivalent mouse commands.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
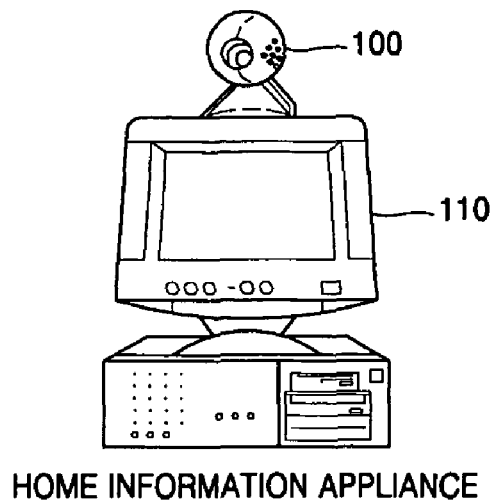
FIG. 1 is a schematic diagram of a virtual mouse system according to an exemplary embodiment of the present invention.
Figure 1:
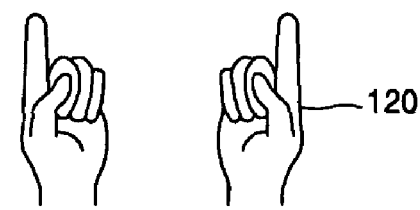

FIG. 1 is a schematic diagram of a virtual mouse system according to an exemplary embodiment of the present invention. Referring to FIG. 1, the virtual mouse system recognizes gestures of both hands 120 by using a video camera 100 connected to an information appliance 110, such as a computer or a set-top box.

The information appliance 110 displays predetermined output information on the screen of a monitor. The video camera 110 is connected to the information appliance 110 via an interface, such as a USB or an IEEE 1394 interface. The gestures made by the two hands120 captured by the video camera 100 are input to the information appliance 110 and then processed by the information appliance 110.

Figure 2:
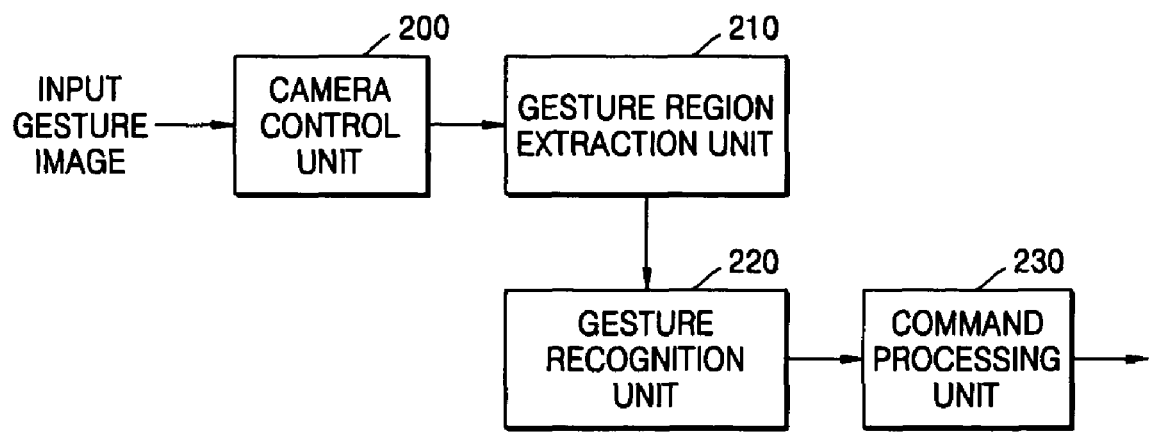
FIG. 2 is a block diagram of a virtual mouse driving apparatus according to an exemplary embodiment of the present invention.

FIG. 2 is a block diagram of a virtual mouse driving apparatus according to an exemplary embodiment of the present invention. Referring to FIG. 2, the virtual mouse driving apparatus includes a camera control unit 200, a gesture region extraction unit 210, a gesture recognition unit 220, and a command processing unit 230.

In order to precisely capture an image of left-hand and right-hand gestures, the location of the video camera 100 needs to be adjusted. Therefore, the camera control unit 200 adjusts the location of the video camera 100 through various camera controls, for example, through pan/tilt/zoom control, with reference to gesture information input by the video camera 100. In other words, the camera control unit 200 traces the input gesture information using color information of the input gesture image, such as information regarding the color of the skin of a user. For example, if the user moves outside the range of the video camera 100, the video camera 100 may not be able to properly capture an image of the gestures of the user. Thus, the camera controller 200 moves the video camera 100 through pan/tilt/zoom control so that the user can always be located in the middle of a gesture image captured by the video camera 100.

The gesture region extraction unit 210 removes a background portion of the input gesture image acquired by the camera control unit 200 with reference to the color information of the input gesture image and then extracts a left-hand region and a right-hand region from the input gesture image whose background portion has been removed. For example, suppose that the camera control unit 200 keeps track of a region of the input gesture image representing the skin of the user. Since the hands and the face of the user are expected to be exposed all the time, the gesture region extraction unit 210 extracts regions of the input gesture image representing the face and the hands of the user, retrieves a hand image by removing part of the extracted region of the input gesture image representing the face of the user, and separates a left-hand region and a right-hand region from the retrieved hand image.

The gesture recognition unit 220 recognizes a left-hand gesture and a right-hand gesture based on the contours and features of the left and right hands of the user, which are extracted using contour and feature extraction techniques, from the left-hand region and the right-hand region provided by the gesture region extraction unit 210. Thereafter, the gesture recognition unit 220 displays a menu, moves a cursor, or selects a predetermined command according to the recognition results provided by the gesture recognition unit 220. Here, the gesture recognition unit 220 may recognize the left-hand gesture and the right-hand gesture using various techniques other than the contour and feature extraction techniques.

The command processing unit 230 interprets and processes gesture commands corresponding to the recognition results provided by the gesture recognition unit 220 as equivalent mouse commands by using a predetermined program installed therein.

Figure 3:
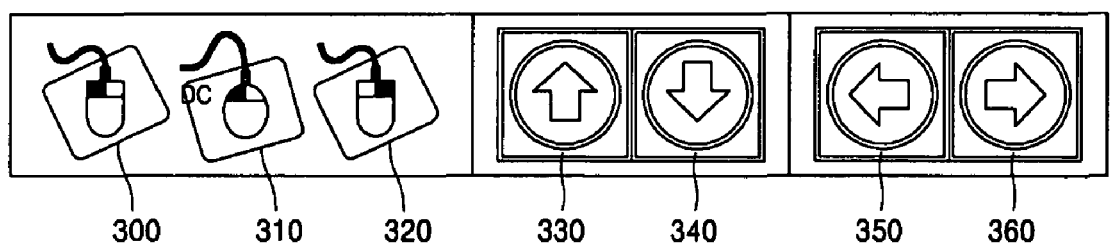
FIG. 3 is a diagram of a graphic user interface-based menu automatically displayed on a screen of an information appliance in response to a left-hand gesture for selecting and clicking a button of a virtual mouse driving apparatus according to an exemplary embodiment of the present invention.

FIG. 3 is a diagram of a graphic user interface-based menu automatically displayed on the screen of the monitor of the information appliance 110 of FIG. 1 in response to a left-hand gesture for selecting and clicking a button of a virtual mouse driving apparatus according to an exemplary embodiment of the present invention. Referring to FIG. 3, once a left-hand gesture is detected, the graphic user interface-based menu is automatically produced and displayed on the screen of the monitor of the information appliance 110. If no further left-hand gestures are detected, the graphic user interface-based menu disappears from the screen of the monitor of the information appliance 110. The graphic user interface-based menu includes command icons 300, 310, and 320 for inputting the effect of clicking buttons of a mouse with a cursor placed at a predetermined location on the screen of the monitor of the information appliance 110 according to a right-hand gesture, command icons 330 and 340 for inputting a scrolling function, and command icons 350 and 360 for inputting a screen movement function. In other words, the command icon 300 represents clicking of a left mouse button, the command icon 310 represents double-clicking of a left mouse button, the command icon 320 represents clicking of a right mouse button, the command icon 330 represents clicking of a scroll button to scroll up the screen of the monitor of the information appliance 110, the command icon 340 represents clicking of a scroll button to scroll down the screen of the monitor of the information appliance 110, the command icon 350 represents clicking of a back button to return to a previous screen, and the command icon 360 represents clicking of a forward button to proceed to a subsequent screen. A left-hand gesture can only be recognized inside the graphic user interface-based menu. One of the command icons 300 through 360 of the graphic user interface-based menu is highlighted when pointed at if a detected left-hand gesture is a pointing gesture, and a command corresponding to the command icon currently pointed at by the cursor is executed if the detected left-hand gesture is a clicking gesture. For the convenience of the user, left-hand gestures may be set to perform the functions of right-hand gestures, and the right-hand gestures may be set to perform the functions of the left-hand gestures by changing settings.

Figure 4:
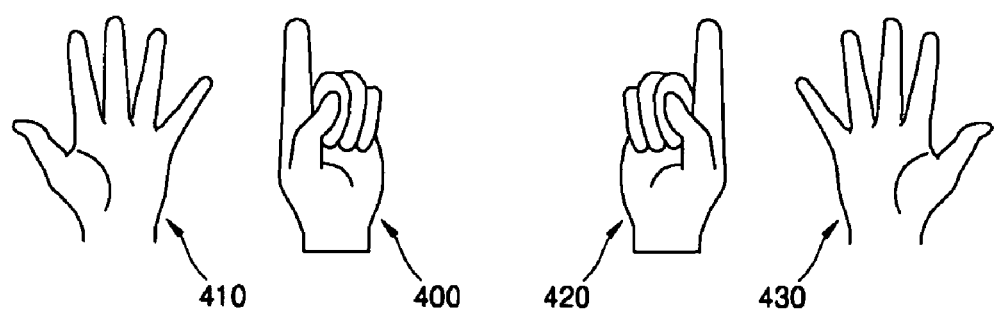
FIG. 4 is a diagram of a plurality of left-hand and right-hand gestures representing a plurality of commands for a virtual mouse driving apparatus according to an exemplary embodiment of the present invention.

FIG. 4 is a diagram illustrating a plurality of gesture commands corresponding to left-hand and right-hand gestures used in a virtual mouse driving apparatus according to an exemplary embodiment of the present invention. Referring to FIG. 4, a first left-hand gesture 400 is used to point at one of the command icons 300 through 360 of the graphic user interface-based menu of FIG. 3, a second left-hand gesture 410 is used to select the command icon by pointing at the command icon, a first right-hand gesture 420 is used to move a cursor on the screen of the monitor of the information appliance 110, and a second right-hand gesture 430 is used to select and drag an object, e.g., a window, on the screen of the monitor of the information appliance 110. Therefore, it is possible to realize the functions of a mouse by using the first and second left-hand gestures 400 and 410 and the first and second right-hand gestures 420 and 430 of FIG. 4 and the graphic user interface-based menu of FIG. 3, which is automatically displayed on the screen of the monitor of the information appliance 110 whenever hand gestures are detected.

Figure 5:
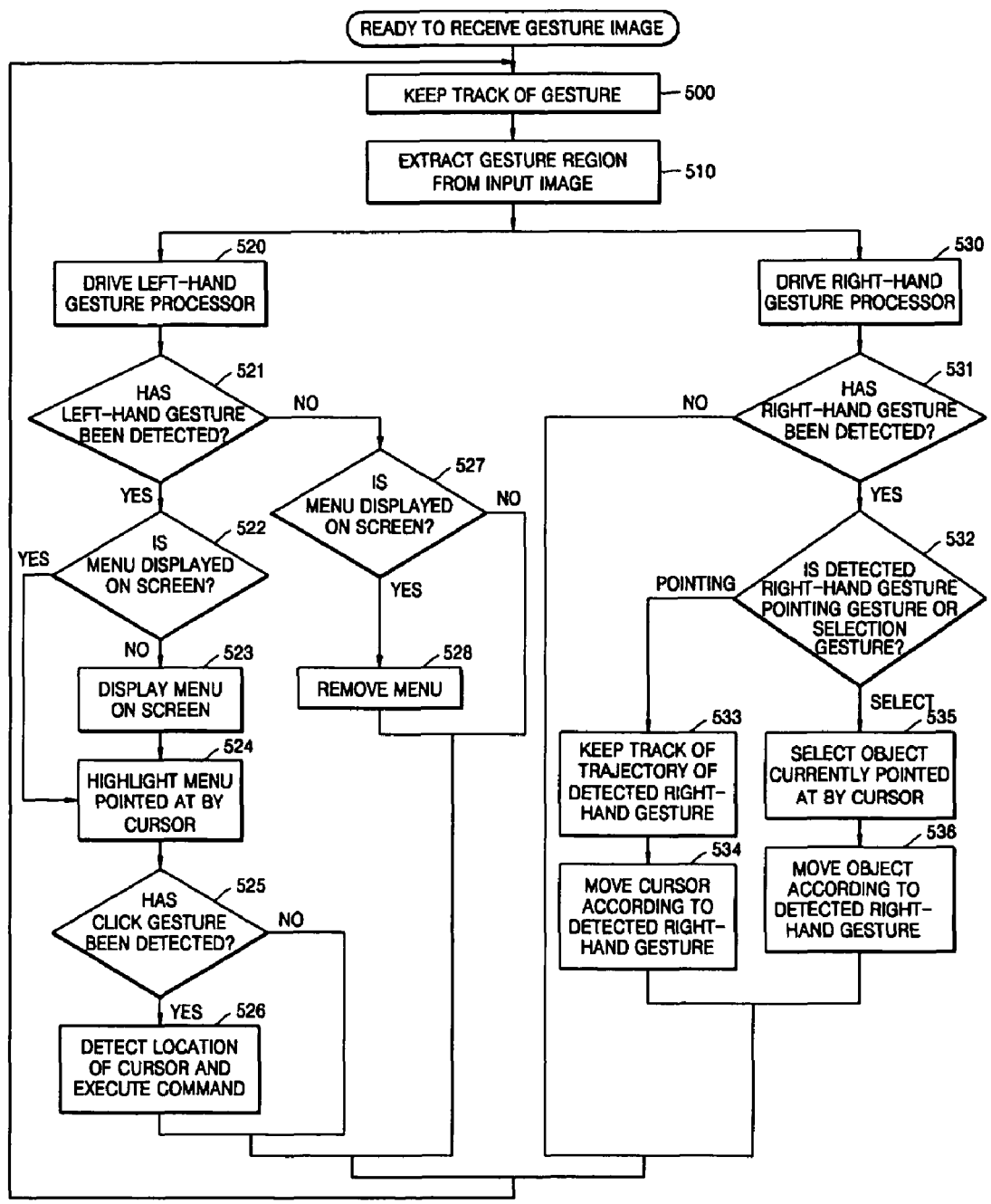
FIG. 5 is a flowchart illustrating a virtual mouse driving method based on two-handed gestures, which is performed by a virtual mouse driving apparatus according to an exemplary embodiment of the present invention.

FIG. 5 is a flowchart illustrating a virtual mouse driving method based on left-hand and right-hand gestures according to an exemplary embodiment of the present invention. Referring to FIGS. 1 and 5, in operation 500, if the virtual mouse driving apparatus according to an exemplary embodiment of the present invention is ready to receive a hand gesture, the location of the video camera 100 is adjusted so that optimum gesture information can be extracted from an input gesture image based on color information of the input gesture image. In operation 510, a background portion of the input gesture image is removed, and a left-hand region and a right-hand region are separated from the input gesture image whose background portion has been removed. Left-hand region information regarding the left-hand gesture region and right-hand region information regarding the right-hand gesture region are input to a left-hand gesture processing program and a right-hand gesture processing program, respectively.

In operation 520, the left-hand gesture processing program is executed. If a left-hand gesture is detected from the left-hand region information in operation 521, a graphic user interface-based menu is automatically displayed on the screen of the monitor of the information appliance 110 in operations 522 and 523. In operation 524, if the detected left-hand gesture is a pointing gesture, one of a plurality of command icons of the graphic user interface-based menu that is pointed at by a cursor according to the detected left-hand gesture is highlighted. If a left-hand selection gesture is detected from the left-hand region information in operation 525, the location of the cursor is detected, and a command corresponding to the highlighted command icon is selected and then executed in operation 526. In operations 527 and 528, if no further left-hand gestures are detected from the left-hand region information, the graphic user interface-based menu disappears from the screen of the monitor of the information appliance 110, and then the virtual mouse driving method returns to operation 500.

In operation 530, the right-hand gesture processing program is executed. If a right-hand gesture is detected from the right-hand region information in operation 531, it is determined whether the detected right-hand gesture is a pointing gesture or a selection gesture. In operation 533, if the detected right-hand gesture is determined to be a pointing gesture, a location designated by the detected right-hand gesture is estimated by calculating the displacement and trajectory of the right hand between the detected right-hand gesture and a previously detected pointing gesture. In operation 534, the cursor is moved to the estimated location. On the other hand, if the detected right-hand gesture is determined to be a selection gesture in operation 531, a predetermined object currently pointed at by the cursor is selected in operation 535 and then is moved based on the displacement and trajectory of the right hand between the detected right-hand gesture and a previously detected selection gesture in operation 536. If no further right-hand gestures are detected from the right-hand region information, the virtual mouse driving method returns to operation 500.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, code, and code segments needed for realizing the present invention can be easily deduced by one of ordinary skill in the art.

As described above, according to the present invention, it is possible to efficiently process various gesture commands in the same manner as commands input by a conventional mouse input device are processed by recognizing gestures of the left and right hands of a user and automatically driving a menu based on the recognition results. In addition, it is possible to more efficiently represent the various gesture commands with simple hand gestures and provide high gesture recognition rates and high gesture recognition speed in the present invention where a variety of commands are represented by two-handed gestures and the menu automatically driven by a hand gesture is used than in the prior art where as many commands are represented by one-handed gestures instead of two-handed gestures. Moreover, it is possible to provide an efficient substitute for a conventional mouse input device by providing a more convenient interface environment in which natural hand gestures of a user can be precisely recognized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A virtual mouse driving method using a video camera comprising:
   keeping track of an input gesture captured with the video camera;
   removing a background portion of the input gesture image with reference to information of the input gesture image and extracting both a left-hand region and a right-hand region from the input gesture image having the background portion thereof removed, wherein the information of the input gesture image includes information regarding a color of skin of a user;
   recognizing a left-hand gesture from the extracted left-hand region and recognizing a right-hand gesture from the extracted right-hand region and recognizing gesture commands corresponding to a combination of both the left-hand recognition results and the right-hand recognition results,
   wherein the left-hand gesture and the right-hand gesture are recognized on the basis of the contours and features of a right hand and a left hand of the user; and
   executing the recognized gesture commands;
   wherein one of the left-hand gesture and the right-hand gesture is selected as a gesture corresponding to a first-hand for selecting a command function among a plurality of command functions, wherein the plurality of command functions correspond to a plurality of command icons in a menu which is displayed on a screen of a display device, and
   the remaining one of the left-hand gesture and the right-hand gesture is selected as a gesture corresponding to a second-hand for controlling an action on the display device,
   wherein the recognizing of the gesture commands comprises:
   detecting the gesture corresponding to the first-hand, displaying the menu on the screen in response to the detection of the gesture corresponding to the first-hand, and recognizing one of a plurality of command icons of the displayed menu currently pointed at by or selected by a cursor according to the detected gesture corresponding to the first-hand; and
   detecting the gesture corresponding to the second-hand and recognizing an object currently pointed at or selected by the cursor according to the detected gesture corresponding to the second-hand.

2. The virtual mouse driving method of claim 1, wherein the recognizing of the gesture commands further comprises:
   displaying the menu on the screen if the gesture corresponding to the first hand is detected;
   highlighting one of the plurality of command icons of the displayed menu pointed at by a cursor according to the detected gesture corresponding to the first-hand if the detected gesture corresponding to the first-hand is determined to be a pointing gesture; and
   detecting the location of the cursor and executing a command corresponding to the highlighted command icon if another gesture corresponding to the first-hand is detected and is determined to be a clicking gesture.

3. The virtual mouse driving method of claim 2, further comprising making the menu disappear if no further hand gestures are detected.

4. The virtual mouse driving method of claim 1, wherein the recognizing of the gesture commands further comprises:
if the gesture corresponding to the second hand is detected, determining whether the gesture corresponding to the second-hand is a pointing gesture or a selection gesture;
varying the location of a cursor by keeping track of a location designated by the detected gesture corresponding to the second-hand if the detected gesture corresponding to the second-hand is determined to be a pointing gesture; and
selecting an object currently pointed at by the cursor and varying the location of the object by keeping track of the location designated by the detected gesture corresponding to the second-hand if the detected gesture corresponding to the second-hand is determined to be a selection gesture.

5. The virtual mouse driving method of claim 4, wherein the location designated by the detected gesture corresponding to the second-hand is within a displayed menu.

6. The virtual mouse driving method of claim 4, wherein the varying of the location of the cursor comprises calculating a displacement and trajectory between the detected gesture corresponding to the second-hand and a previously detected gesture corresponding to the second-hand and varying the location of the cursor based on the calculated displacement and trajectory.

7. A virtual mouse driving apparatus comprising:
a camera control unit keeping track of a gesture, and capturing an input gesture image with a video camera;
a gesture region extraction unit removing a background portion of the input gesture image with reference to information of the input gesture image, and extracting both a left-hand region and a right-hand region from the input gesture image having the background portion thereof removed, wherein the information of the input gesture image includes information regarding a color of skin of a user;
a gesture recognition unit sensing left-hand gestures based on contours and features of the left hand extracted from the extracted left-hand region by the gesture region extraction unit and right-hand gestures based on contours and features of the right hand extracted from the extracted right hand-region by the gesture region extraction unit and recognizing gesture commands represented by both the sensed left-hand and right-hand gestures; and
a command processing unit processing the gesture commands recognized by the gesture recognition unit as equivalent mouse commands,
wherein one of the left-hand gestures and the right-hand gestures is selected as a gesture corresponding to a first-hand for selecting a command function among a plurality of command functions, wherein the plurality of command functions correspond to a plurality of command icons in a menu displayed on a screen of a display device, and
the remaining one of the left-hand gesture and the right-hand gesture is selected as a gesture corresponding to a second-hand for controlling an action on the display device,
wherein the gesture recognition unit comprises:
a first-hand gesture processor displaying the menu on the screen when the gesture corresponding to the first-hand is detected,
wherein the first-hand gesture processor highlights one of a plurality of command icons of the displayed menu pointed at by a cursor when the detected gesture corresponding to the first-hand is determined to be a pointing gesture, and
wherein the first-hand gesture processor selects and executes a command corresponding to the highlighted command icon when another gesture corresponding to the first-hand is further detected and is determined to be a clicking gesture; and
a second-hand gesture processor determining whether the gesture corresponding to the second-hand is the pointing gesture or a selection gesture,
wherein the second-hand gesture processor varies the location of the cursor by keeping track of a location designated by the detected second-hand gesture when the detected gesture corresponding to the second-hand is determined to be a pointing gesture, and
wherein the second-hand gesture processor selects an object currently pointed at by the cursor and varies the location of the object when the detected gesture corresponding to the second-hand is determined to be a selection gesture.

8. A virtual mouse driving method using a video camera comprising:
keeping track of an input gesture captured with the video camera;
removing a background portion of the input gesture image with reference to information of the input gesture image, and extracting both a first region and a second region from the input gesture image having the background portion thereof removed, wherein the information of the input gesture image includes information regarding a color of skin of a user;
recognizing a first-hand gesture from the extracted first region and recognizing a second-hand gesture from the extracted second region, and recognizing gesture commands corresponding to a combination of both the first-hand recognition results and the second-hand recognition results, the gesture commands consisting of a pointing gesture and a selecting gesture,
wherein the first-hand gesture and the second-hand gesture are recognized on the basis of the contours and features of a right hand and a left hand of the user; and
executing the recognized gesture commands;
when the first-hand gesture is the pointing gesture, a graphic user interface-based menu comprising a plurality of command icons corresponding to mouse commands is navigated, the mouse commands comprising:
a left-click command;
a right-click command;
a double-click command;
a scroll-up command;
a scroll-down command;
a forward-click command; and
a back-click command;
when the first-hand gesture is the selecting gesture, selecting a command icon among the plurality of command icons so as to execute the corresponding mouse command;
when the second-hand gesture is the pointing gesture, controlling movement of a curser on a display device; and
when a second-hand gesture is the selecting gesture, selecting and dragging an object displayed on the display device.

* * * * *